United States Patent
Singer (10) Patent No.: US 10,463,056 B2
(45) Date of Patent: *Nov. 5, 2019

(54) SINGLE-SERVE LIQUID COFFEE CONCENTRATE

(71) Applicant: Nicholas J. Singer, Irvine, CA (US)

(72) Inventor: Nicholas J. Singer, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,774

(22) Filed: Mar. 15, 2018

(65) Prior Publication Data

US 2019/0281854 A1   Sep. 19, 2019

(51) Int. Cl.
*A23F 5/24*     (2006.01)
*A47J 31/40*    (2006.01)
*B65D 17/00*    (2006.01)

(52) U.S. Cl.
CPC .............. *A23F 5/243* (2013.01); *A47J 31/402* (2013.01); *B65D 17/02* (2013.01)

(58) Field of Classification Search
CPC ........ A47J 31/402; A47J 31/46; A47J 31/369; A47J 31/56; A47J 31/3633; A47J 31/3695; A47J 31/3676; A47J 31/22
USPC .............. 99/280, 282, 283, 295, 300, 323; 426/110, 112, 115, 425, 431, 433, 594
See application file for complete search history.

(56) References Cited

U.S. PATENT DOCUMENTS

| | | | |
|---|---|---|---|
| 2005/0001340 A1* | 1/2005 | Page | A23L 2/54 261/121.1 |
| 2012/0009304 A1* | 1/2012 | Perentes | A47J 31/22 426/110 |
| 2013/0118360 A1 | 5/2013 | Dogan et al. | |
| 2013/0309371 A1* | 11/2013 | Abegglen | A47J 31/22 426/112 |
| 2014/0299000 A1* | 10/2014 | Hanneson | A47J 31/46 99/300 |
| 2015/0327713 A1 | 11/2015 | Pruitt | |

OTHER PUBLICATIONS

Folgers Instant Coffee, www.folgerscoffee.com/coffees/instant-coffee-products [Published as early as Apr. 28, 2016].

* cited by examiner

*Primary Examiner* — Phuong T Nguyen
(74) *Attorney, Agent, or Firm* — Klein, O'Neill & Singh, LLP (57) ABSTRACT

A system for preparing an individual serving of coffee using a liquid coffee concentrate includes a sealed container containing an amount of liquid coffee concentrate for the preparation of an individual serving of coffee. The system may include a coffee maker operable to prepare a single serving of coffee from the liquid coffee concentrate contained in the sealed container, the coffee maker including a coffee maker recess for receiving the sealed container, a needle for piercing an entrance hole in an upper portion of the sealed container while the sealed container is in the coffee maker recess, a water conduit by which water from a water source flows into the sealed container through the entrance hole, and a heater for heating the water. The system may include an adapter for receiving the sealed container and positioning the sealed container in the coffee maker recess.

9 Claims, 9 Drawing Sheets

SINGLE-SERVE LIQUID COFFEE CONCENTRATE

CROSS-REFERENCE TO RELATED APPLICATIONS

Not Applicable

STATEMENT RE: FEDERALLY SPONSORED RESEARCH/DEVELOPMENT

Not Applicable

BACKGROUND

Many people enjoy drinking coffee as part of a daily routine. However, preparing coffee is time-consuming and can be an inefficient use of time and energy (including electrical energy) when only a single cup is to be prepared. Meanwhile, coffee makers that are designed to prepare a single cup of coffee using a single-serve ground coffee container (e.g. a Keurig® K-Cup® pod) produce an enormous amount of waste that is harmful to the environment. The result of single use K-Cup type pods is that the planet is literally being destroyed. Tens of billions of pods end up in landfills annually. If the discarded pods are placed end-to-end, they would circle the globe 12 times! This means that the waste problem is growing and will grow as more companies and unless mitigated will continue to cause problems exponentially for our planet.

BRIEF SUMMARY

The present disclosure contemplates various systems and methods for preparing an individual serving of coffee. An amount of liquid coffee concentrate to prepare an individual serving of coffee is packaged in a sealed container. Unlike single-serve ground coffee containers like Keurig® K-Cup® pods, the sealed container of liquid coffee concentrate does not need to contain a filter since the process of preparing coffee from a liquid coffee concentrate involves no brewing and produces no used coffee grounds. Due to the absence of a filter and the concentrated nature of liquid coffee concentrate, the sealed container of liquid coffee concentrate can be very small, for example, sized to contain about 5-10 mL of liquid coffee concentrate. A single sealed container of liquid coffee concentrate can be used to prepare a serving of coffee using an existing coffee maker (e.g. a Keurig® coffee maker) designed for single-serve ground coffee containers (e.g. Keurig® K-Cup® pods). An adapter may be provided for receiving the sealed container of liquid coffee concentrate and positioning the sealed container in the coffee maker. When the coffee maker is operated, an upper portion of the sealed container may be pierced by a needle of the coffee maker to allow heated water to flow into the sealed container. A lower portion of the sealed container may be pierced by a needle of the adapter or may be otherwise compromised to allow the combined liquid coffee concentrate and hot water to flow out of the sealed container and into a user's coffee cup.

In accordance with one embodiment, there is a system for preparing an individual serving of coffee using a liquid coffee concentrate. The system includes a sealed container containing an amount of liquid coffee concentrate for the preparation of an individual serving of coffee and a coffee maker operable to prepare a single serving of coffee from the liquid coffee concentrate contained in the sealed container. The coffee maker includes a coffee maker recess for receiving the sealed container, a first coffee maker needle for piercing an entrance hole in an upper portion of the sealed container while the sealed container is in the coffee maker recess, a water conduit by which water from a water source flows into the sealed container through the entrance hole, and a heater for heating the water.

The system may include an adapter for receiving the sealed container and positioning the sealed container in the coffee maker recess, the coffee maker recess receiving the sealed container while the sealed container is in the adapter. The adapter may include an adapter recess for receiving the sealed container, and an exterior sized to fit the coffee maker recess. The adapter may include an adapter needle for piercing an exit hole in a lower portion of the sealed container when the sealed container is pressed into the adapter recess by operation of a lid of the coffee maker being closed down on the sealed container. A combination of the water and the liquid coffee concentrate may flow out of the sealed container through the exit hole.

The sealed container may include a shell having one or more holes in a lower portion thereof, and a coating that covers the one or more holes and melts when contacted by water that has been heated by the heater. A combination of the water and the liquid coffee concentrate may flow out of the sealed container through the one or more holes. The shell may be made from a durable paper and the coating may be made from a waterproof wax, plastic, or parchment.

The coffee maker may include a second coffee maker needle for piercing an exit hole in a lower portion of the sealed container when the sealed container is pressed into the coffee maker recess by operation of a lid of the coffee maker being closed down on the sealed container. A combination of the water and the liquid coffee concentrate may flow out of the sealed container through the exit hole.

The sealed container may contain about 5-10 mL of liquid coffee concentrate.

The sealed container may be have an exterior volume of less than 25 mL.

In accordance with another embodiment, there is a system for preparing an individual serving of coffee using a liquid coffee concentrate and a coffee maker having a coffee maker recess for receiving a single-serve ground coffee container. The system includes a sealed container containing an amount of liquid coffee concentrate for the preparation of an individual serving of coffee, and an adapter for receiving the sealed container and positioning the sealed container in the coffee maker recess. The adapter includes an upper portion having an adapter recess for receiving the sealed container, and an exterior sized to fit the coffee maker recess.

The adapter may include an adapter needle for piercing an exit hole in a lower portion of the sealed container when the sealed container is pressed into the adapter recess by operation of a lid of the coffee maker being closed down on the sealed container. A combination of the liquid coffee concentrate and water from the coffee maker may flow out of the sealed container through the exit hole.

The sealed container may include a shell having one or more holes in a lower portion thereof, and a coating that covers the one or more holes and melts when contacted by water that has been heated by a heater of the coffee maker. A combination of the water and the liquid coffee concentrate may flow out of the sealed container through the one or more holes. The shell may be made from a durable paper and the coating may be made from a waterproof wax, plastic, or parchment.

The sealed container may contain about 5-10 mL of liquid coffee concentrate.

The sealed container may have an exterior volume of less than 25 mL.

In accordance with another embodiment, there is a system for preparing an individual serving of coffee using a liquid coffee concentrate. The system includes a sealed container, and liquid coffee concentrate inside the sealed container in an amount for the preparation of an individual serving of coffee.

The sealed container may include a shell having one or more holes in a lower portion thereof, and a coating that covers the one or more holes and melts when contacted by water that has been heated by a heater of a coffee maker. A combination of the water and the liquid coffee concentrate may flow out of the sealed container through the one or more holes. The shell may be made from a durable paper and the coating may be made from a waterproof wax, plastic, or parchment.

The sealed container may contain about 5-10 mL of liquid coffee concentrate.

The sealed container may have an exterior volume of less than 25 mL.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems and methods for preparing an individual serving of coffee using a liquid coffee concentrate. A person wishing to make a single serving of coffee takes a sealed container 10 of liquid coffee concentrate 20 and places it in a coffee maker 50. The sealed container 10 of liquid coffee concentrate 20 may be very small (e.g. sized to contain about 5-10 mL of liquid coffee concentrate) in comparison to single-serve ground coffee containers like Keurig® K-Cup® pods or Nespresso® capsules. The coffee maker 50 may be a Keurig®, Nespresso® or other coffee maker that is designed to be used with single-serve ground coffee containers. The sealed container 10 may be placed inside an adapter 30 that positions the sealed container 10 in the coffee maker 50. The person then closes the lid 58 of the coffee maker 50 down on the sealed container 10, causing a needle 66 of the coffee maker 50 to puncture an upper portion of the sealed container 10 and allowing heated water to flow into the sealed container 10 through the puncture hole. A needle 38 of the adapter 30 may puncture a bottom portion of the sealed container 10, or the sealed container 10A may be designed to burst open in the bottom portion when filled with hot water, allowing the combined liquid coffee concentrate 20 and heated water to flow down into the person's coffee cup. Afterward, the sealed container 10, which is now punctured or otherwise compromised, may be thrown away or recycled, depending on its material composition. In either case, little waste is produced because the sealed container 10 needs no internal filter and may contain only the liquid coffee concentrate, making it much smaller than a single-serve ground coffee container such as a Keurig® K-Cup® pod or a Nespresso® capsule.

Figure 1A:
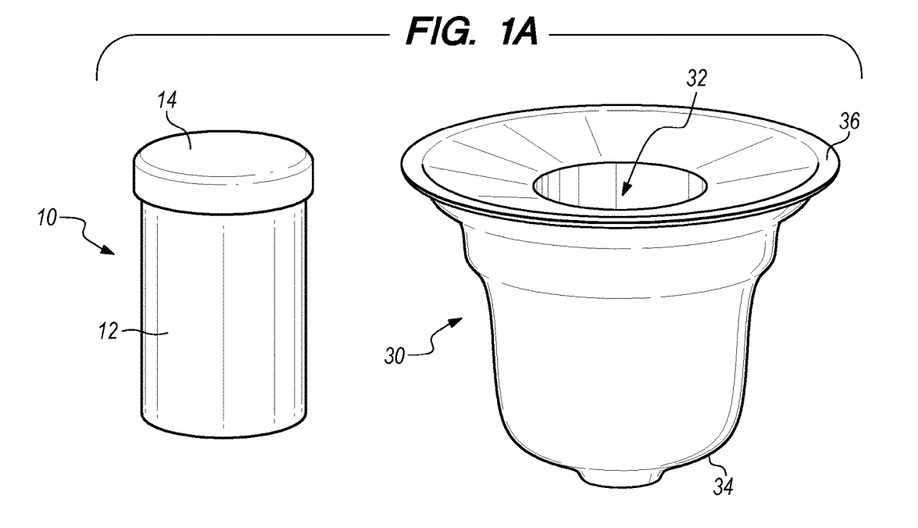
FIG. 1A is a perspective view of a sealed container of liquid coffee concentrate and an adapter according to an embodiment of the present disclosure.
Figure 1B:
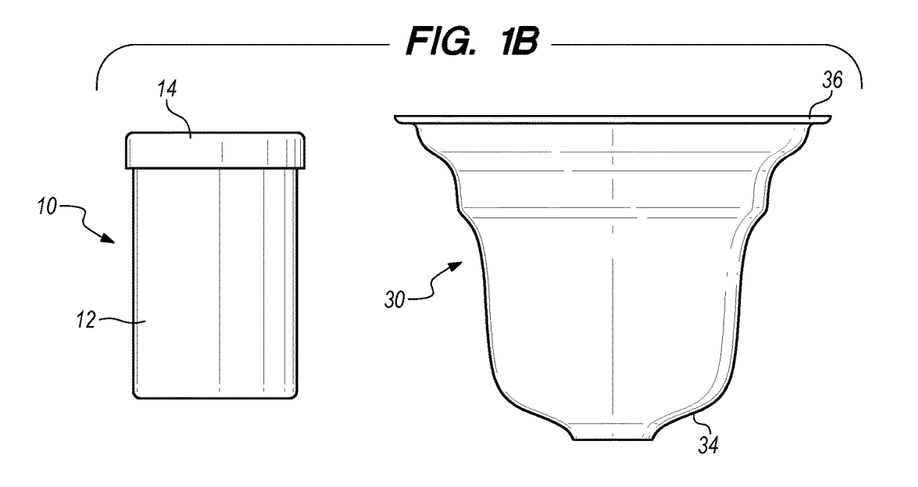
FIG. 1B is a side view of the sealed container and the adapter.
Figure 2:
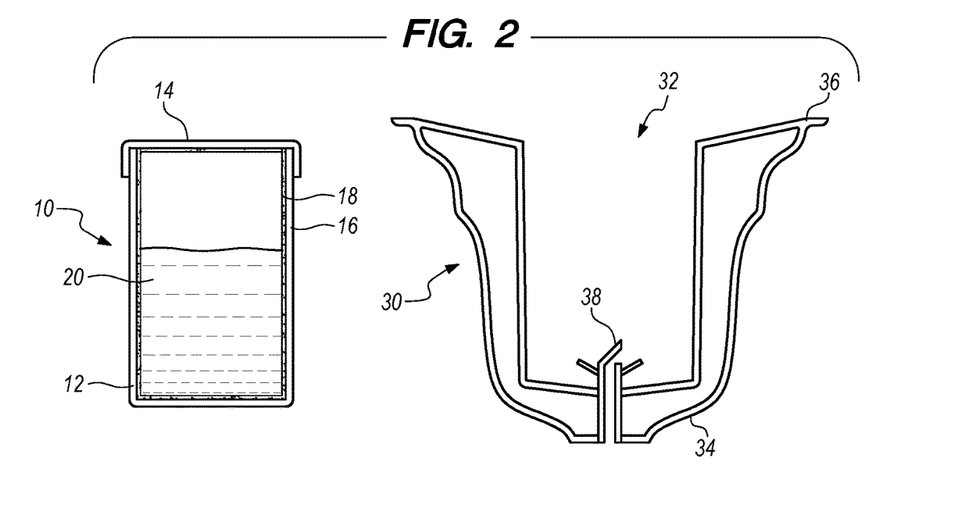
FIG. 2 is a cross-sectional view of the sealed container and the adapter.

FIGS. 1A, 1B, and 2 are a perspective view, a side view, and a cross-sectional view, respectively, of a sealed container 10 of liquid coffee concentrate 20 and an adapter 30 according to an embodiment of the present disclosure. The sealed container 10 may contain an amount of liquid coffee concentrate 20 for the preparation of an individual serving of coffee, e.g. 5-10 mL of liquid coffee concentrate 20. The sealed container 10 may have a generally cylindrical body 12 as shown with a protruding cap 14 that extends laterally outward relative to the body 12 (e.g. by 2-10 mm). When the sealed container 10 is inserted into the adapter 30, the body 12 may fit inside a recess 32 of the adapter 30 while the protruding cap 14 does not fit inside the recess 32. In this way, the protruding cap 14 may prevent the sealed container 10 from being inserted too far into the recess 32 and may provide a convenient handhold for a person removing the sealed container 10 after it has been used.

The sealed container 10 may be made of a recyclable or biodegradable material or combination of materials. For example, as shown in FIG. 2, the sealed container 10 may include an exterior shell 16 made of a durable paper (e.g. lightweight cardboard) that is coated with an interior coating 18 such as a waterproof wax (e.g. paraffin wax), plastic (e.g. polyethylene), or parchment. For example, the body 12 and protruding cap 14 of the sealed container 10 may be cut, rolled, and/or folded from a sheet of the exterior shell 16 and interior coating 18 materials. The durable paper may be durable enough to allow the exterior shell 16 to maintain its form while being handled in the ordinary usage of the sealed container 10. The body 12 and the protruding cap 14 may both include a portion of the exterior shell 16 and a portion of the interior coating 18. The interior coating 18 may prevent the liquid coffee concentrate 20 from degrading the exterior shell 16, thus allowing the exterior shell 16 to be made from a durable paper such as cardboard. In some cases, the interior coating 18 may not be as recyclable or biodegradable as the exterior shell 16 and may instead melt off the exterior shell 16 and into the coffee as the coffee is prepared from hot water mixing with the liquid coffee concentrate 20. In such cases, the interior coating 18 may be made of a material that is harmless when ingested and does not appreciably affect the taste of the coffee.

As noted above, the sealed container 10 may contain, for example, 5-10 mL of liquid coffee concentrate 20. The overall capacity of the sealed container 10 may be equal to the amount of liquid coffee concentrate 20 contained in the sealed container 10, or may be greater, with the remaining space filled with a quantity of air. The capacity of the sealed container 10 may range from the minimum capacity needed to contain the desired amount of liquid coffee concentrate 20 (e.g. 5 mL, but may be lower depending on the concentration of the liquid coffee concentrate 20 and the desired strength of the coffee) up to a maximum capacity depending on the size of the coffee maker that the sealed container 10 will be used with. For example, if the sealed container 10 will be inserted in an adapter 30 inside a Keurig® coffee maker, a relatively large sealed container 10 may have a capacity of around 40 mL. In the interest of minimizing the size of the sealed container 10, the capacity of the sealed container 10 may be less than 20 mL, preferably less than 15 mL, more preferably less than 10 mL.

Accounting for the material(s) of the sealed container 10 itself, the sealed container 10 may have an exterior volume that is slightly greater than its capacity, where the exterior volume is defined as the total volume of liquid displaced when the sealed container 10 is submerged in the liquid. Such exterior volume may similarly range between low values around 5 mL and relatively high values around 40 mL, with the exterior volume greater than the capacity of the sealed container 10 by an amount defined by the volume displaced by the material(s) of the sealed container 10. For example, assuming the material(s) of the sealed container 10 displace 5 mL, the exterior volume of the sealed container 10 may be less than 25 mL, preferably less than 20 mL, more preferably less than 15 mL.

The recess 32 of the adapter 30 may be generally cylindrical to match the shape of the sealed container 10 and may be wider (e.g. having a greater diameter) than the sealed container 10, except that the recess 32 may be narrower (e.g. having a smaller diameter) than the protruding cap 14 of the sealed container 10. In this way, the recess 32 may be shaped to prevent the sealed container 10 from being inserted too far into the adapter 30 and becoming irretrievable. The exterior of the adapter 30 may be shaped to fit inside an existing coffee maker in the same way that a single-serve ground coffee container fits inside the coffee maker. Thus, for example, the exterior of the adapter 30 may be shaped like a Keurig® K-Cup® pod, a Nespresso® capsule, etc., depending on which existing coffee maker the adapter 30 is designed for. It is also contemplated that the adapter 30 may be designed to universally match two or more such existing coffee makers (e.g. by matching a height dimension of one and a width dimension of another).

Figure 4A:
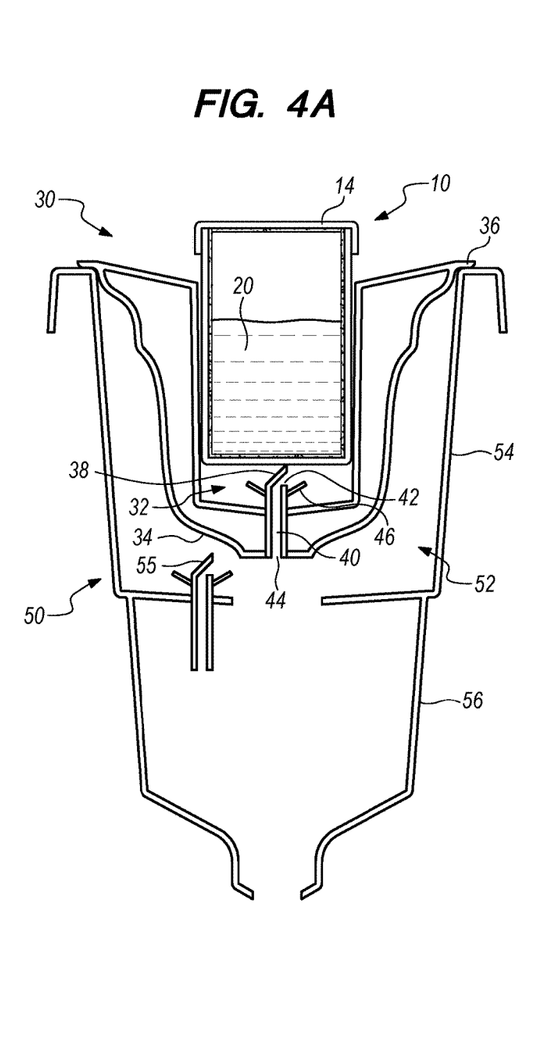
FIGS. 4A and 4B are schematic representations of a coffee maker including cross-sectional views of the sealed container placed inside the adapter with the adapter placed inside the coffee maker, with FIG. 4A showing the coffee maker in an open position and FIG. 4B showing the coffee maker in a closed position.
Figure 4B:
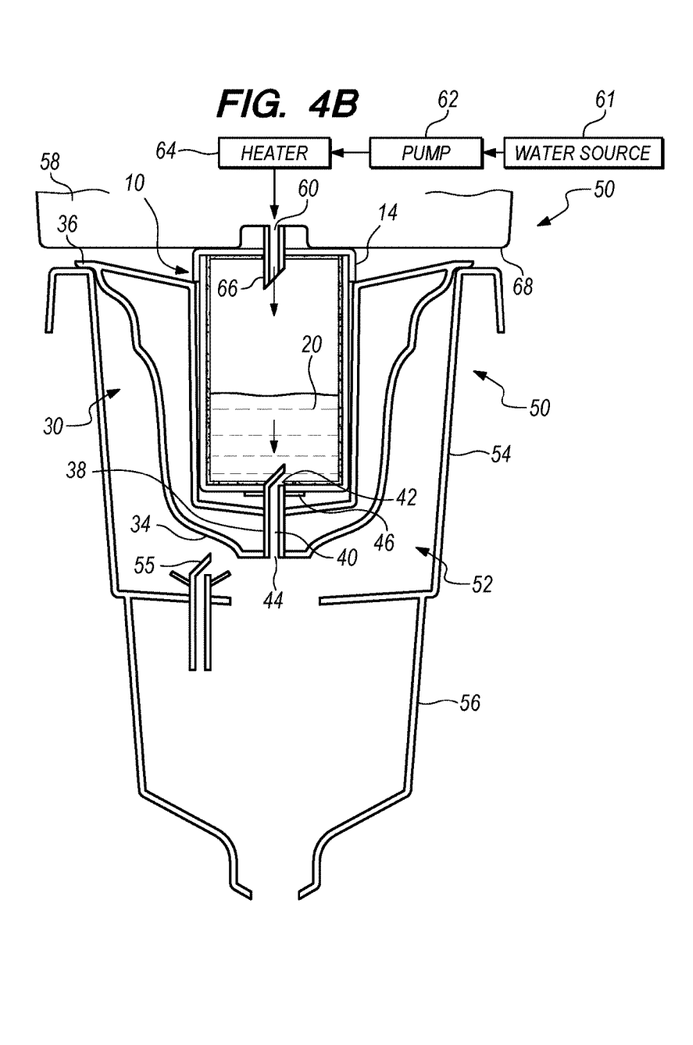

In some cases, an existing coffee maker may have a needle positioned to pierce a lower portion of a single-serve ground coffee container. For example, a Keurig® coffee maker may have a part known as a K-Cup® holder that functions as a recess for receiving a K-Cup® pod, and the K-Cup® holder may have a part known as an exit needle that is positioned to pierce the bottom of the K-Cup® pod at a peripheral region of the K-Cup® pod. The adapter 30 may be shaped so as to avoid touching or pressing hard against such needle as shown in FIGS. 4A and 4B. In this regard, the adapter 30 may have a reduced height relative to the recess of the coffee maker, so as not to extend deeply enough into the recess to reach the needle, or the adapter 30 may have an exterior contour with a sloped or stepped region 34 in a lower portion thereof that slopes or steps inward to avoid the needle. Such reduced height and/or sloped or stepped region 34 may symmetrically define the exterior of the adapter 30 or may occur only in a portion of the adapter 30, e.g. as a dedicated slot to receive the needle. Meanwhile, the upper portion of the adapter 30 may have an outwardly extending lip 36 that extends laterally outward from the recess 32 in the upper portion of the adapter 30. In this way, just as the protruding cap 14 of the sealed container 10 may prevent the sealed container 10 from being inserted too far into the recess 32 of the adapter 30, the lip 36 of the adapter may prevent the adapter 30 from being inserted too far into the recess of the coffee maker. By holding the adapter 30 at the top of the recess of the coffee maker, the lip 36 may allow the adapter 30 to avoid the needle of the coffee maker.

As shown in FIG. 2, the interior of the adapter 30 may include a hollow adapter needle 38 that acts as a fluid conduit between the recess 32 of the adapter 30 and the bottom of the adapter 30. The adapter needle 38 may have a sharp point at the top and be positioned to puncture the bottom portion of the sealed container 10 when the sealed container 10 is pressed down into the recess 32 of the adapter 30.

The adapter 30 may be made of a hard plastic such as polypropylene and may be manufactured by injection molding, with the adapter needle 38 made of a metal alloy such as stainless steel or carbon steel.

Figure 3:
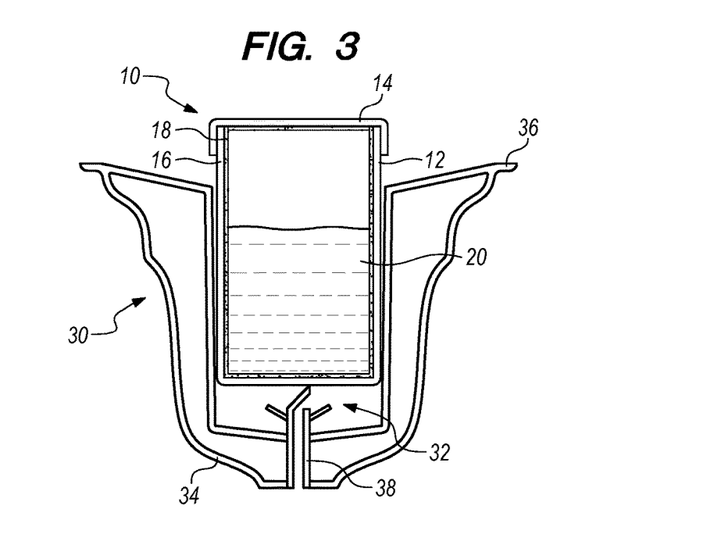
FIG. 3 is a cross-sectional view of the sealed container and the adapter with the sealed container placed inside the adapter.

FIG. 3 is a cross-sectional view of the sealed container 10 and the adapter 30 with the sealed container 10 placed inside the adapter 30. As shown in FIG. 3, the sealed container 10 may fit snugly in the recess 32 of the adapter 30, with the recess 32 of the adapter 30 slightly larger than the sealed container 10. In the case of a cylindrical sealed container 10 and a cylindrical recess 32, the recess 32 may have an inner diameter that is slightly greater (e.g. 2-10 mm) than the exterior diameter of the sealed container 10. When the sealed container 10 is placed inside the recess 32 of the adapter 30, the sealed container 10 may initially come to rest on top of the adapter needle 38 without being punctured. In this way, the sealed container 10 may be positioned in the adapter 30 (before or after the adapter is placed inside the coffee maker) without prematurely releasing the liquid coffee concentrate 20 from the sealed container 10.

FIGS. 4A and 4B are schematic representations of a coffee maker 50 including cross-sectional views of the sealed container 10 placed inside the adapter 30 with the adapter 30 placed inside the coffee maker 50, with FIG. 4A showing the coffee maker 50 in an open position and FIG. 4B showing the coffee maker 50 in a closed position. In FIG. 4A, the sealed container 10 is resting on top of the adapter needle 38 as in FIG. 3. Meanwhile, the entire adapter 30 is positioned inside a recess 52 of the coffee maker 50. The illustrated recess 52 is a K-Cup® holder as used in Keurig® coffee makers, including an exit needle part 54 (e.g. a Keurig® portion pack holder) and a funnel part 56. As can be seen, the adapter 30 is positioned in the recess 52 so as to avoid an exit needle 55 of the exit needle part 54. In the example of FIGS. 4A and 4B, the full height of the adapter 30 is great enough to extend down past the tip of the exit needle 55 while the lip 36 of the adapter 30 rests on the outside of the recess 52. In this example, the adapter 30 can still avoid the exit needle 55 due to its exterior contour having a sloped region 34 that slopes inward to avoid the exit needle 55 as shown.

In addition to the recess 52 (having the exit needle part 54 and the funnel part 56), the coffee maker 50 shown in FIGS. 4A and 4B has a lid 58 (see FIG. 4B), a water conduit 60, a pump 62, and a heater 64. The water conduit 60 provides water for making a cup of coffee. For example, water from a water source 61 may flow through the water conduit 60 and into the sealed container 10 as described in more detail below. The water source 61 may be, for example, a fillable water tank of the coffee maker 60. The pump 62 may pump the water from the water source 61 to the sealed container 10 via the water conduit 60, and the heater 64 may heat the water. For example, the heater 64 may heat the water while the water is at the water source 61 (e.g. in a water tank) or while the water is en route to the sealed container 10 (e.g. as the water flows through piping or tubing or one or more heating tanks of the water conduit 60). Thus, the heater 64 may heat only the amount of water needed for an individual cup of coffee or may heat a larger batch of water. The heater 64 may be an electric heater that heats the water by Joule heating.

It is also contemplated that the water source 61 may be a connection to a cold water line of a building, similar to that used by a refrigerator that has a water dispenser or ice maker. In this case, the pump 62 may be omitted as the pressure in the water line is used to bring the water to the sealed container 10 via the water conduit 60.

The lid 58 of the coffee maker 50 has an entrance needle 66 for piercing a hole in an upper portion of the sealed container 10 while the sealed container 10 is in the recess 52 of the coffee maker 50. The entrance needle 66 may be hollow and act as a part of the water conduit 60 (e.g. with an upper end of the entrance needle 66 connected to tubing or piping of the water conduit 60). In this way, the water from the water source 61 may flow through the water conduit 60 and into the sealed container 10 through the tip of the entrance needle 66 after the entrance needle 66 punctures the hole in the sealed container 10. To this end, the entrance needle 66 may have a sharp point at the bottom and be positioned to puncture the top portion of the sealed container 10 when the lid 58 is pressed down onto the sealed container 10 sitting into the recess 32 of the adapter 30. As the lid 58 is pressed down onto the sealed container 10, a bottom face 68 of the lid 58 may abut against the sealed container 10 to press the sealed container 10 down into the recess 32 of the adapter 30. In this way, the action of the lid 58 may, in addition to causing the entrance needle 66 to pierce the upper portion of the sealed container 10, cause the sealed container 10 to press against the tip of the adapter needle 38 so that the adapter needle 38 punctures the lower portion of the sealed container 10.

The adapter needle 38 may have an internal passage 40 with an inlet 42 near the point of the adapter needle 38 where the adapter needle 38 punctures the sealed container 10 and an outlet 44 at the bottom of the adapter 30. When the adapter needle 38 punctures the sealed container 10, a combination of the liquid coffee concentrate 20 and heated water may flow into the inlet 42, through the internal passage 40, and out of the outlet 44 and into the person's coffee cup where additional mixing of the liquid coffee concentrate 20 and heated water may occur. Just below the inlet 42, a gasket 46 may be provided to function as a seal around the adapter needle 38. The gasket 46 may prevent the liquid coffee concentrate 20 and heated water from escaping around the outside of the adapter needle 38 through the puncture hole created by the adapter needle 38. The gasket 46 may be angled upward so as to function as a funnel that directs any fluid leaving through the puncture hole into the inlet 42 of the internal passage 40 of the adapter needle 38. The gasket 46 may also function as a seal against the sealed container 10. For example, the sealed container 10 and adapter 30 may be designed so that the height of the sealed container 10 below the protruding cap 14 matches the depth of the gasket 46 within the recess 32 of the adapter 30. More specifically, the gasket 46 may be made of a flexible material (e.g. rubber) that is capable of bending downward as the sealed container 10 presses down on it, so as to remain in contact with the sealed container 10 for a range of depths (spanning 1-5 mm, for example). The sealed container 10 and adapter 30 may be designed so that the bottom of the sealed container 10 falls within this range of depths when the protruding cap 14 rests on the adapter 30 outside the recess 32. In this way, it may be assured that the bottom of the sealed container 10 presses against the gasket 46, with the gasket 46 functioning as a seal between the adapter needle 38 and the sealed container 10. The gasket 46 may thus prevent the liquid coffee concentrate 20 and heated water from escaping around the outside of the adapter needle 38 and gasket 46 through the puncture hole created by the adapter needle 38.

Figure 5A:
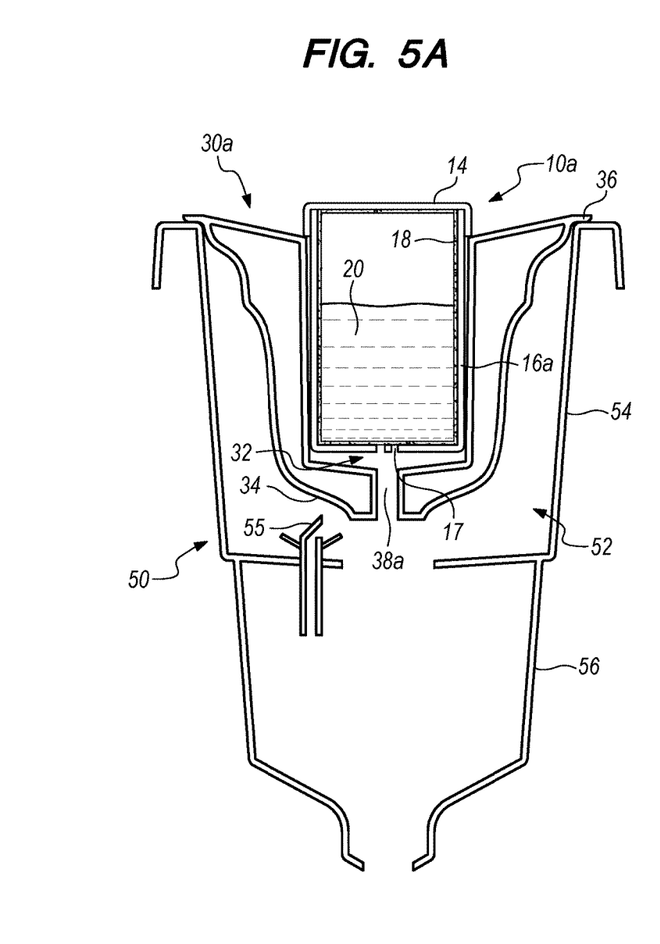
FIGS. 5A and 5B are schematic representations of a coffee maker including cross-sectional views of a sealed container placed inside an adapter with the adapter placed inside the coffee maker according to another embodiment of the present disclosure, with FIG. 5A showing the coffee maker in an open position and FIG. 5B showing the coffee maker in a closed position.
Figure 5B:
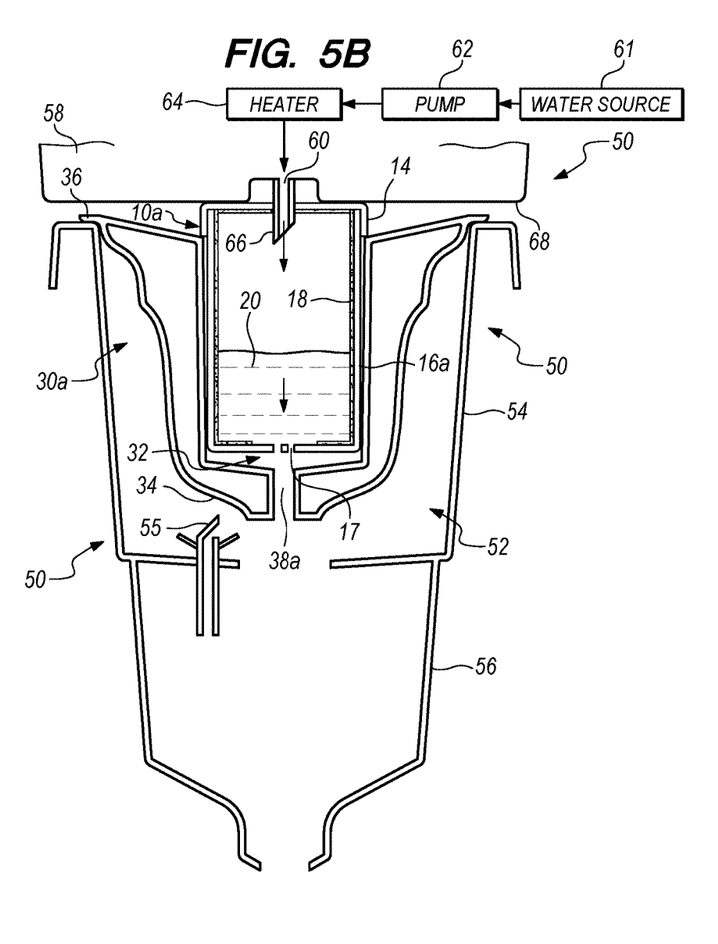

FIGS. 5A and 5B are schematic representations of the coffee maker 50 including cross-sectional views of a sealed container 10a placed inside an adapter 30a with the adapter 30a placed inside the coffee maker 50 according to another embodiment of the present disclosure, with FIG. 5A showing the coffee maker 50 in an open position and FIG. 5B showing the coffee maker 50 in a closed position. The coffee maker 50 may be the same as the coffee maker 50 described in relation to FIGS. 4A and 4B. FIGS. 5A and 5B differ from FIGS. 4A and 4B in the features of the sealed container 10a and adapter 30a. The sealed container 10a may be the same as the sealed container 10 except that the exterior shell 16a of the sealed container 10a includes one or more holes 17 in a lower portion thereof, with the interior coating 18 covering the one or more holes 17. The one or more holes 17 may be used to allow a mixture of liquid coffee concentrate 20 and heated water to burst out from the sealed container 10 when preparing a serving of coffee. To this end, the adapter 30a may be the same as the adapter 30 except that the adapter 30a omits the adapter needle 38, including, in its place, a borehole 38a extending from the recess 32 of the adapter 30a to the bottom of the adapter 30a. The borehole 38a may be present in the adapter 30 as well, with the only difference being the presence of the adapter needle 38 filling the borehole 38a in the adapter 30.

As described above, water from the water source 61 may be pressurized by the pump 62 and heated by the heater 64 as it flows through the water conduit 60. When the heated and pressurized water flows from the water conduit 60 into the sealed container 10a, the added heat and/or pressure of the water shooting into the sealed container 10a and against the bottom of the sealed container 10a may melt or otherwise degrade the interior coating 18 covering the one or more holes 17, allowing the combined water and liquid coffee concentrate 20 to flow out of the sealed container 10a through the one or more holes 17. Along the same lines, instead of the one or more holes 17, the exterior shell 16a may have a kiss cut or other perforation or weakening in the lower portion thereof (preferably bottom exterior side), in the shape of a starburst for example. In this case, the pressure of the water shooting into the sealed container 10a may blow out the exterior shell 16a itself, rather than only the interior coating 18. In either case, the combined water and liquid coffee concentrate 20 may then flow through the borehole 38a of the adapter 30a and down into the person's coffee cup. It should be noted that the pressure of water and/or steam required to burst through the interior coating 18 and/or exterior shell 16a of the sealed container 10a should be less than the threshold pressure of any pressure shutoff switch of the pump 62.

In the case of the sealed container 10a and adapter 30a, there is no adapter needle 38 that punctures the bottom of the sealed container 10a. Therefore, there is no danger of premature puncturing by the adapter needle 38, and the sealed container 10a may be completely inserted into the adapter 30a at an initial stage as shown in FIG. 5A without needing to be pressed farther into the recess 32 of the adapter 30a by the lid 58 of the coffee maker 50. That is, the sealed container 10a may always come to rest with the protruding cap 14 against the top of the adapter 30a (preventing the sealed container 10a from falling too far into the recess 32 of the adapter 30a) as shown in FIG. 5A, never in an elevated position resting on the adapter needle 38 as in the case of the sealed container 10 and adapter 30 as shown in FIG. 4A.

Figure 6A:
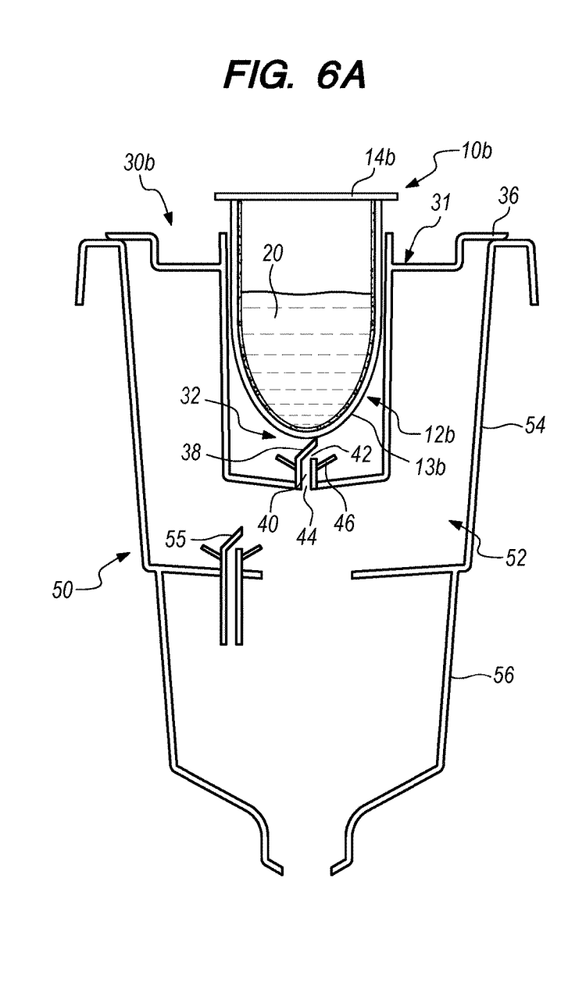
FIGS. 6A and 6B are schematic representations of a coffee maker including cross-sectional views of a sealed container placed inside an adapter with the adapter placed inside the coffee maker according to another embodiment of the present disclosure, with FIG. 6A showing the coffee maker in an open position and FIG. 6B showing the coffee maker in a closed position.
Figure 6B:
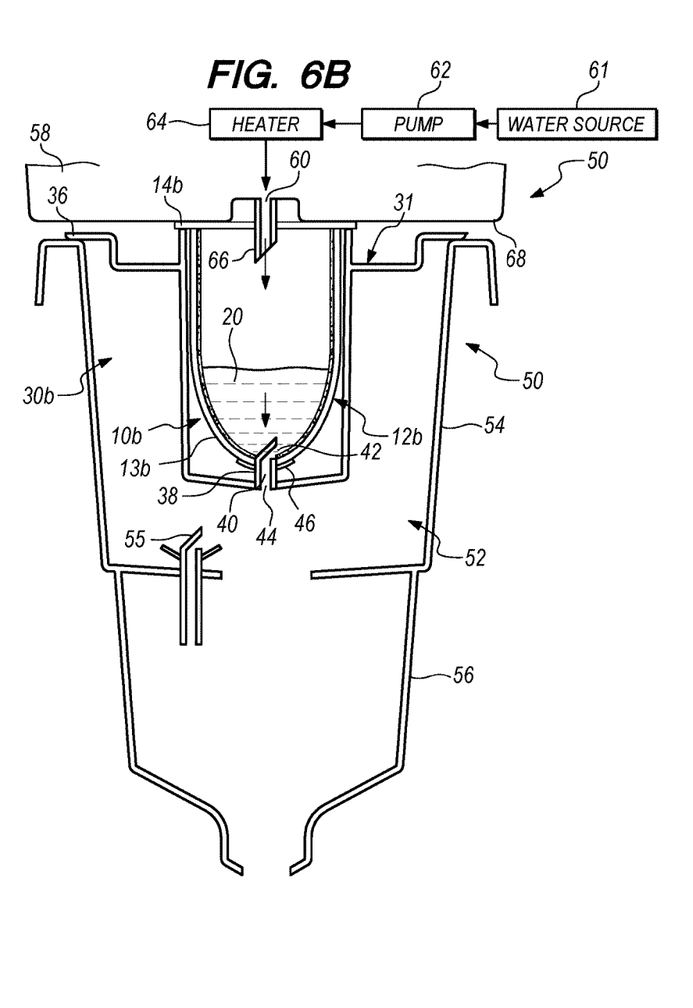

FIGS. 6A and 6B are schematic representations of the coffee maker 50 including cross-sectional views of a sealed container 10b placed inside an adapter 30b with the adapter 30b placed inside the coffee maker 50 according to another embodiment of the present disclosure, with FIG. 6A showing the coffee maker 50 in an open position and FIG. 6B showing the coffee maker 50 in a closed position. The coffee maker 50 may be the same as the coffee maker 50 described in relation to FIGS. 4A and 4B. FIGS. 6A and 6B differ from FIGS. 4A and 4B in the features of the sealed container 10b and adapter 30b. The sealed container 10b may be the same as the sealed container 10 except that, unlike the body 12 of the sealed container 10, the body 12b of the sealed container 10b has a rounded bottom 13b. In other respects, the body 12b may be the same as the body 12 and may be, for example, generally cylindrical like the body 12. The rounded bottom 13b may advantageously act as a funnel within the sealed container 10b, aiding the flow of all of the liquid coffee concentrate 20 and heated water contained in the sealed container 10b to the same part of the sealed container 10b for efficient flow out of the sealed container 10b. For example, if the adapter needle 38 is positioned to puncture the center of the sealed container 10b, the rounded bottom 13b may be structured to funnel the contents of the sealed container 10b to a point at the center of the sealed container 10b where a hole is punctured by the adapter needle 38. Similarly, in a case where there is no adapter needle 38 and the sealed container 10b has holes 17 or other burst-through mechanism like the sealed container 10a of FIGS. 5A and 5B, the rounded bottom 13b may be structured to funnel the contents of the sealed container 10b to the vicinity of the one or more holes 17 or other mechanism. The rounded bottom 13b may also allow for easy manufacture of the sealed container 10b, e.g., as it may be produced from a single sheet of material. The rounded bottom 13b may be half-spherical or exhibit any other curvature. The rounded bottom 13b may include portions that are not curved, such as a central flat portion allowing the sealed container 10b to be placed upright without falling over.

The sealed container 10b may also differ from the sealed container 10 in that the sealed container 10b may have a protruding film 14b in place of the protruding cap 14. The protruding film 14b may be made of an easily puncturable material such as aluminum foil or a laminate of aluminum foil and paper or plastic, which may cause the entrance needle 66 of the coffee maker 50 to degrade less quickly as it is repeatedly used to pierce sealed containers 10b. The protruding film 14b may obviate the need for the interior coating 18 to extend beyond the body 12b (e.g. to the protruding cap 14 described above), as the protruding film 14b itself may be made of a material that is resistant to degradation caused by the liquid coffee concentrate 20. The protruding film 14b may also allow for easy manufacture of the sealed container 10b, e.g. as the protruding film 14b may be produced as a single sheet and without folded portions.

The adapter 30b may be the same as the adapter 30 or the adapter 30a. The adapter 30b shown in FIGS. 6A and 6B differs from the adapter 30 and 30a to illustrate some modifications in design that may be applied to any of the adapters 30, 30a, 30b. For example, the adapter 30b has an annular depression 31 around the recess 32 in place of a sloping region of the adapters 30 and 30a. The depression 31 is especially useful in the case of the sealed container 10b because the protruding film 14b may have much less height than the protruding cap 14. Without the depression 31, it might be difficult to retrieve the sealed container 10b from the recess 32 of the adapter 30b after use, since the protruding film 14b might be almost flush against the top of the adapter 30b. The depression 31 provides a place for a person's finger to go when grabbing the sealed container 10b, making retrieval of the sealed container 10b from the adapter 30b easier. The adapter 30b also illustrates an example in which the overall reduced height of the adapter 30b relative to the recess 52 of the coffee maker 50, rather than the exterior contour of the adapter 30b having a sloped or stepped region 34, may be used to avoid the exit needle 55 of the coffee maker 50.

Figure 7A:
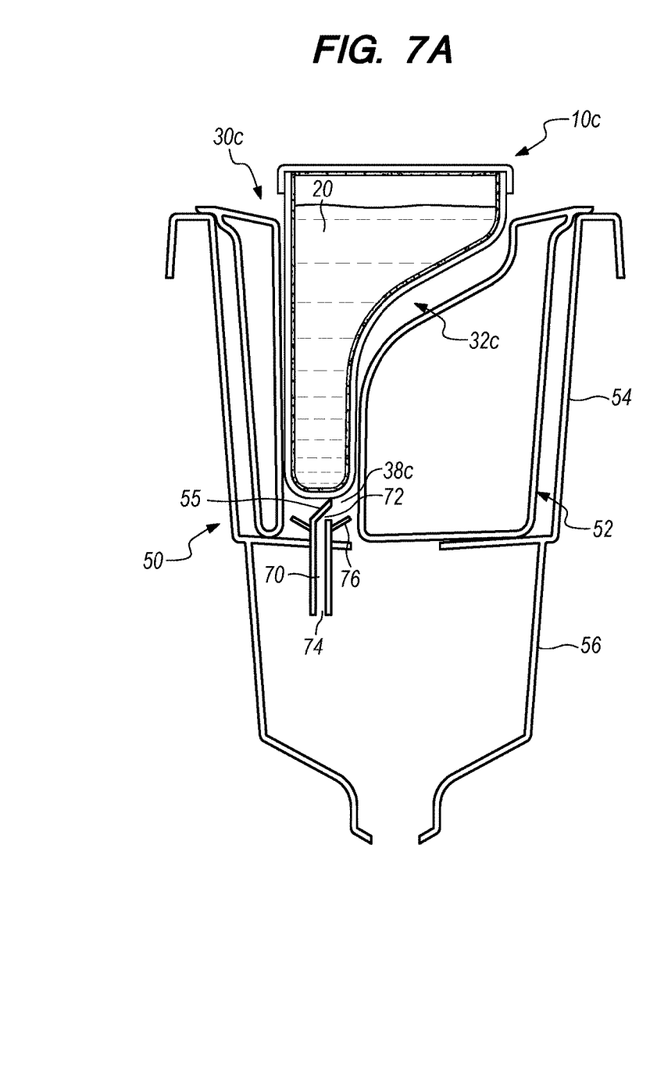
FIGS. 7A and 7B are schematic representations of a coffee maker including cross-sectional views of a sealed container placed inside an adapter with the adapter placed inside the coffee maker according to another embodiment of the present disclosure, with FIG. 7A showing the coffee maker in an open position and FIG. 7B showing the coffee maker in a closed position.
Figure 7B:
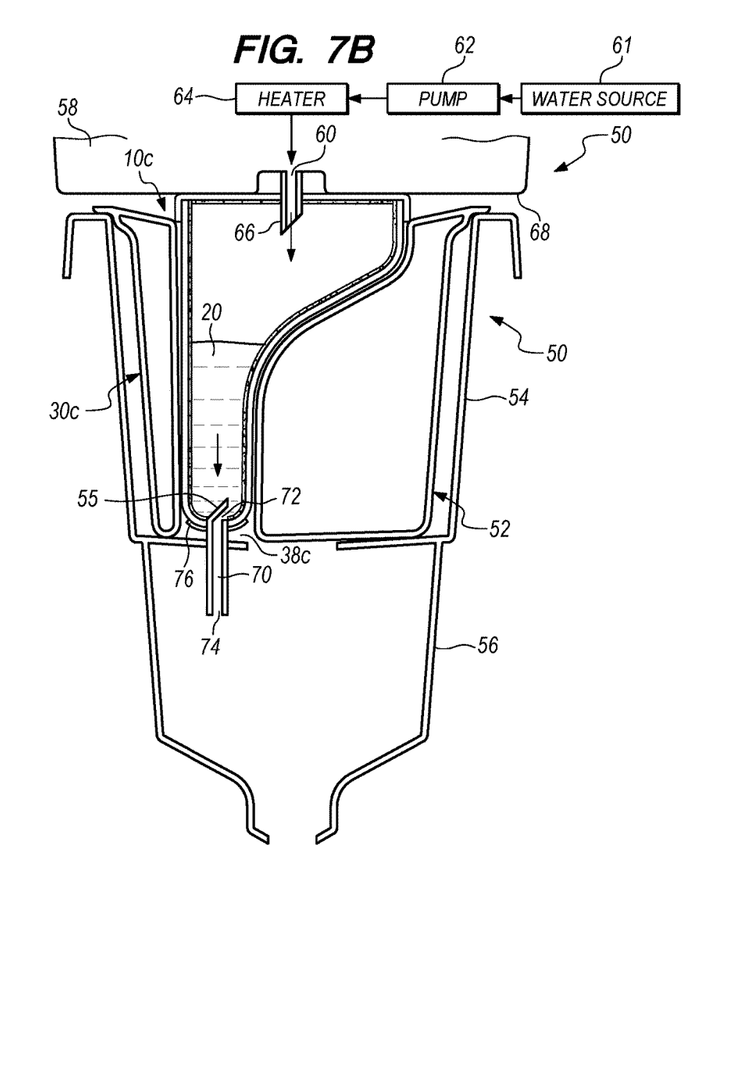

FIGS. 7A and 7B are schematic representations of the coffee maker 50 including cross-sectional views of a sealed container 10c placed inside an adapter 30c with the adapter 30c placed inside the coffee maker 50 according to another embodiment of the present disclosure, with FIG. 7A showing the coffee maker 50 in an open position and FIG. 7B showing the coffee maker 50 in a closed position. The coffee maker 50 may be the same as the coffee maker 50 described in relation to FIGS. 4A and 4B. FIGS. 7A and 7B differ from FIGS. 4A and 4B in the features of the sealed container 10c and adapter 30c. The sealed container 10c and adapter 30c may be the same as the sealed container 10 and adapter 30a except that, as shown in FIGS. 7A and 7B, the sealed container 10c and adapter 30c may be shaped to take advantage of the existing exit needle 55 of the exit needle part 54 of the coffee maker 50. As such, rather than having a sloped region 34 that slopes inward to avoid the exit needle 55 as described in relation to FIGS. 4A and 4B, the exterior contour of the adapter 30c may remain wide enough in the vicinity of the exit needle 55 so as to allow the exit needle 55 to extend into a borehole 38c of the adapter 30c. In this regard, the borehole 38c may be structurally the same as the borehole 38a described in relation to FIGS. 5A and 5B, with the difference being its positioning in relation to the exit needle 55.

With the borehole 38c positioned to correspond to the exit needle 55, which is off-center, the recess 32c may similarly be provided off-center in the adapter 30c. More particularly, the recess 32c may have a shape that is off-center toward the bottom while being centered in the adapter 30c toward the top. As shown in FIGS. 7A and 7B, for example, the recess 32c may have a generally upside-down L-shaped profile that diminishes in cross-sectional area from the top to the bottom of the adapter 30c. By providing such an adapter 30c, a correspondingly shaped sealed container 10c may be placed in the recess 32c such that the top of the sealed container 10c may be punctured by a central entrance needle 66 and the bottom of the sealed container 10c may be punctured by an off-center exit needle 55. In this way, both the needles 66, 55 of the existing coffee maker 50 may be used and the adapter needle 38 is not required. Heated water may flow from the water conduit 60 into the sealed container 10c through the entrance needle 66, and the combined heated water and liquid coffee concentrate 20 may flow out of the sealed container 10c through the exit needle 55 and down into the person's coffee cup. More specifically, the exit needle 55 may have an internal passage 70 with an inlet 72 near the point of the exit needle 55 where the exit needle 55 punctures the sealed container 10c and an outlet 74 that feeds into the funnel part 56 of the coffee maker 50. When the exit needle 55 punctures the sealed container 10c, a combination of the liquid coffee concentrate 20 and heated water may flow into the inlet 72, through the internal passage 70, and out of the outlet 74. Just below the inlet 72, a gasket 76 may be provided to function as a seal around the exit needle 55 in the same way that the gasket 46 may function as a seal around the adapter needle 38.

Figure 8A:
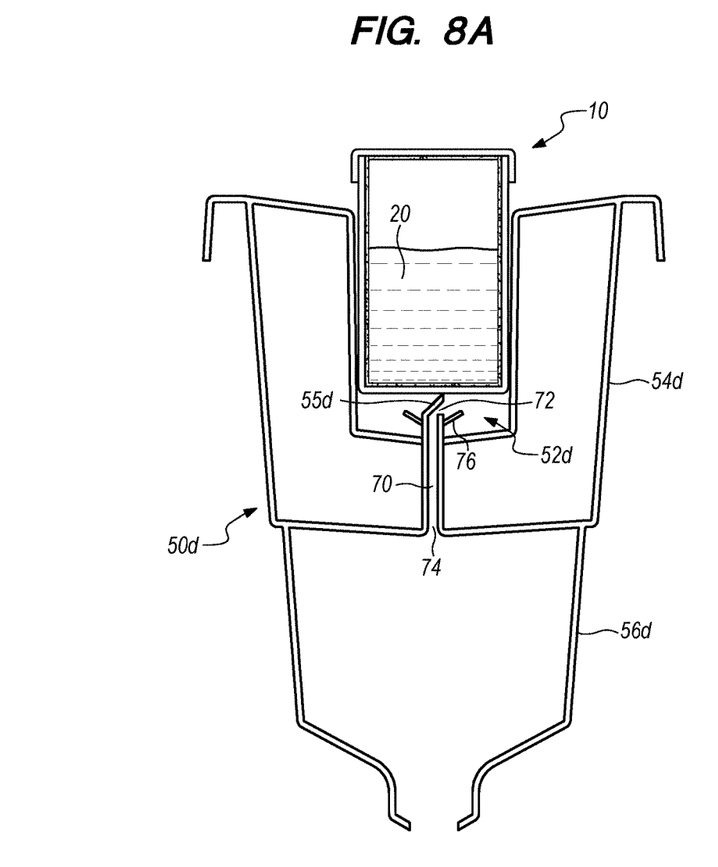
FIGS. 8A and 8B are schematic representations of a coffee maker including cross-sectional views of the sealed container of FIGS. 1A-4B placed inside the coffee maker without an adapter, with FIG. 8A showing the coffee maker in an open position and FIG. 8B showing the coffee maker in a closed position.
Figure 8B:
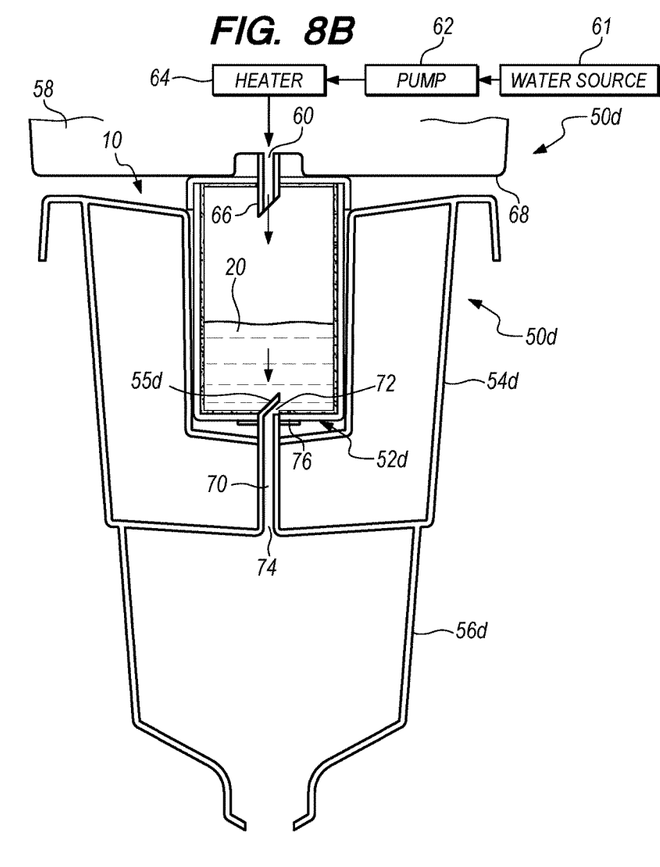

FIGS. 8A and 8B are schematic representations of a coffee maker 50d including cross-sectional views of the sealed container 10 of FIGS. 1-4B placed inside the coffee maker 50d without an adapter 30, with FIG. 8A showing the coffee maker 50d in an open position and FIG. 8B showing the coffee maker 50d in a closed position. The coffee maker 50d may differ from the coffee maker 50 described above in that the coffee maker 50d may be specifically designed for use with the sealed container 10, i.e. with no adapter 30 necessary. In this regard, the coffee maker 50d may be the same as the coffee maker 50 in all respects except for the recess 52. Whereas the recess 52 includes an exit needle part 54 with an off-center exit needle 55, the recess 52d of FIGS. 8A and 8B includes an exit needle part 54d with an exit needle 55d that is located in the center. The recess 52d may further include a funnel part 56d that is the same as the funnel part 56 except that it is designed to align with the centered exit needle 55d of the exit needle part 54d rather than the off-center exit needle 55 of the exit needle part 54. The recess 52d may further differ from the recess 52 in that it may have a generally smaller interior than the recess 52 of an existing coffee maker 50 (e.g. a Keurig® coffee maker). This is because, as described above, the sealed container 10 may be significantly smaller than a single-serve ground coffee container like a Keurig® K-Cup® pod. In use, heated water may flow from the water conduit 60 into the sealed container 10 through the entrance needle 66, and the combined heated water and liquid coffee concentrate 20 may flow out of the sealed container 10 through the exit needle 55d and down into the person's coffee cup.

Alternatively, the coffee maker 50d may omit the exit needle 55d, having only a borehole similar to the borehole 38a but extending downward from the recess 52d of the coffee maker 55d rather than from the recess 32 of the adapter 30a. Such a modified coffee maker 55d could be used with the sealed container 10a having the one or more holes 17. The combined liquid coffee concentrate 20 and heated water may burst from the sealed container 10 as the interior coating 18 covering the one or more holes 17 melts (or as the sealed container 10 itself bursts open as described above), thereafter flowing down through the borehole 38a and into the person's coffee cup.

In the example of the dedicated coffee maker 50d of FIGS. 8A and 8B, a funnel part 56d is included, corresponding to the funnel part 56 of the coffee maker 50 of FIGS. 4A-7B. The funnel part 56 of FIGS. 4A-7B is a feature some existing coffee makers (e.g. Keurig® coffee makers) and therefore is depicted in FIGS. 4A-7B, which may represent embodiments in the context of existing coffee makers. On the other hand, the coffee maker 50d shown in FIGS. 8A and 8B represents a coffee maker 50d that is designed for use with the sealed containers 10, 10a, etc. of the present disclosure. Thus, the funnel part 56d can be omitted.

Figure 9A:
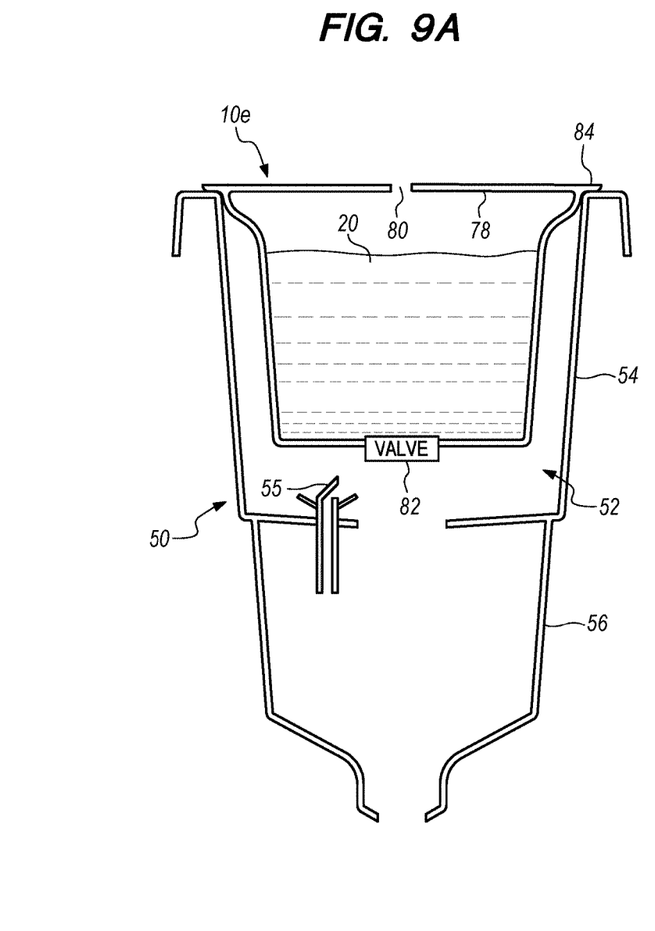
FIGS. 9A and 9B are schematic representations of the coffee maker of FIGS. 4A-7B, including cross-sectional views of a reusable container placed inside the coffee maker without an adapter, with FIG. 9A showing the coffee maker in an open position and FIG. 9B showing the coffee maker in a closed position.
Figure 9B:
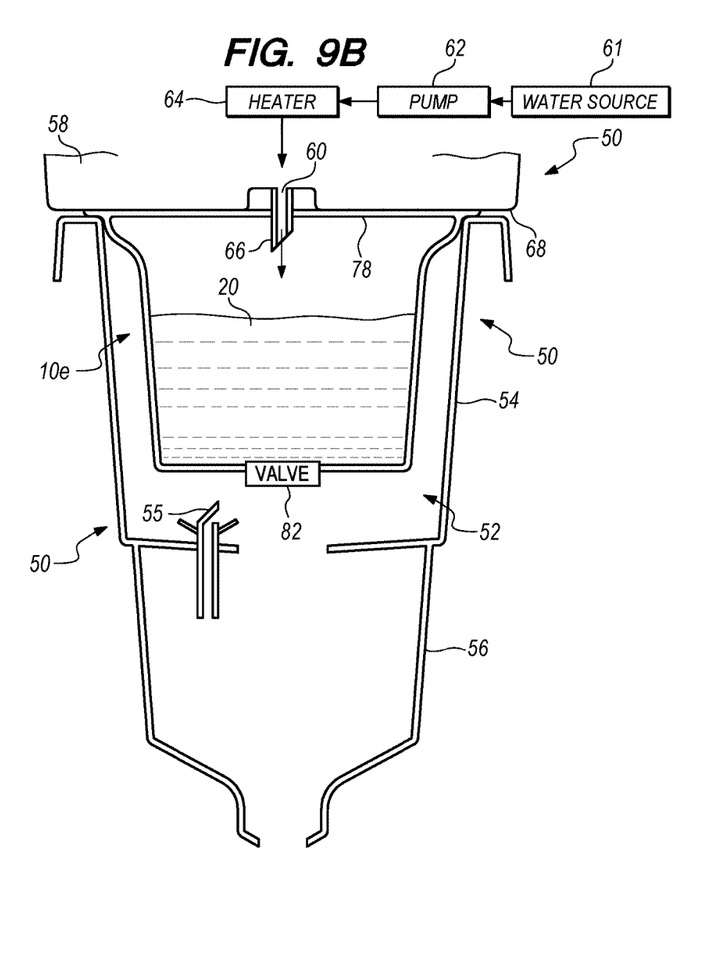

FIGS. 9A and 9B are schematic representations of the coffee maker 50 of FIGS. 4A-7B, including cross-sectional views of a container 10e placed inside the coffee maker 50 without an adapter 30, with FIG. 9A showing the coffee maker 50 in an open position and FIG. 9B showing the coffee maker 50 in a closed position. The container 10e may be a reusable container rather than a disposable container and may differ from the container 10, 10a, etc. described above in several respects. First, the container 10e may have an open or openable top 78 in place of a sealing cap 14 or film 14b. As shown in FIGS. 9A and 9B, for example, the top 78 of the container 10e may contain a central opening 80, but it is also contemplated that the top 78 may be openable, e.g. by a hinge. Second, the container 10e may have a pressure relief valve 82 at the bottom. The pressure relief valve 82, illustrated schematically in FIGS. 9A and 9B, may be of any known construction that is capable of opening in response to a buildup of pressure in the container 10e or in the bottom region thereof. In a simple construction, the pressure relief valve 82 may be a flap or door that is biased in a closed position to seal against the container 10e and opens downward when pushed from above. Third, the overall size and shape of the container 10e may be somewhat larger than that of the container 10, 10a, etc. described above and may, for example, be shaped and sized similarly to a Keurig® K-Cup® pod or other single-serve ground coffee container and designed to fit directly in an exit needle part 54 (e.g. a Keurig® portion pack holder) of the recess 52 of the coffee maker 50 without an adapter 30 similar to how the adapter 30 fits in the exit needle part 54 in FIGS. 4A and 4B. For example, an outwardly extending lip 84 of the container 10e may function just like the lip 36 to allow the container 10e to rest on the exit needle part 54 of the coffee maker 50 without falling in or touching the needle 55. Since the container 10e may be reusable and not disposable, there is less concern about trash than in the case of the container 10, 10a, etc. and it is not as important to achieve a small size.

When a person wishes to use the container 10e, he/she may pump (e.g. from a pump bottle) or otherwise dispense liquid coffee concentrate 20 into the container 10e through the top 78 (e.g. via the opening 80). The person may then place the container 10e inside the recess 52 of the coffee maker 50 as shown in FIG. 9A and lower the lid 58 of the coffee maker 50 as shown in FIG. 9B. Heated water may then flow from the water conduit 60 into the container 10e through the entrance needle 66, and the combined heated water and liquid coffee concentrate 20 may flow out of the container 10e through the valve 82 and down into the person's coffee cup. In this regard, the valve 82 may be configured to remain closed under the pressure of the liquid coffee concentrate 20 (i.e. after dispensing liquid coffee concentrate 20 into the reusable container 10D) and to open under the pressure of the flow of water from the water conduit 60. It should also be noted that the pressure of water and/or steam required to open the pressure relief valve 82 should be less than the threshold pressure of any pressure shutoff switch of the pump 62. When the coffee making process is completed, it may be unnecessary to clean the container 10e, as the heated water from the coffee maker 50 may sufficiently clean the inside of the container 10e as the water flows through the reusable container 10e. Thus, one may immediately reuse the container 10e.

Figure 10A:
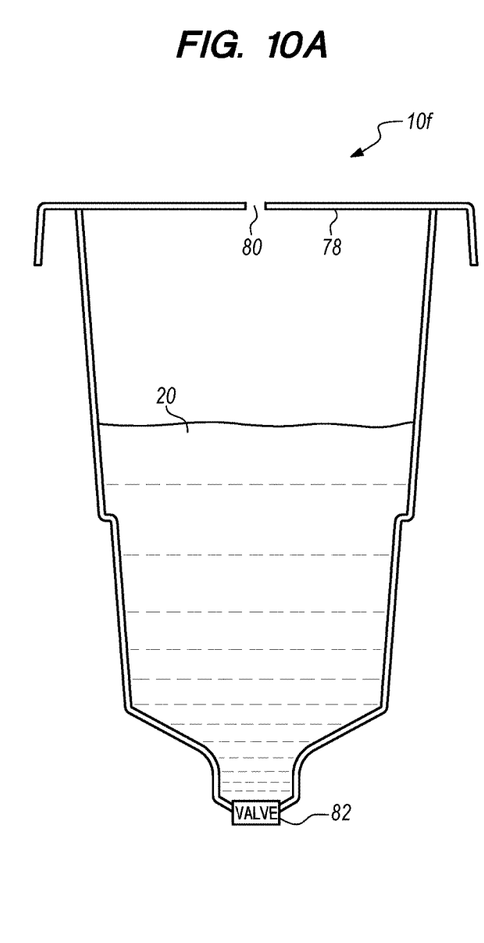
FIGS. 10A and 10B are schematic representations of the coffee maker of FIGS. 4A-7B, 9A, and 9B including cross-sectional views of another reusable container placed inside the coffee maker without an adapter, with FIG. 10A showing the coffee maker in an open position and FIG. 10B showing the coffee maker in a closed position.
Figure 10B:
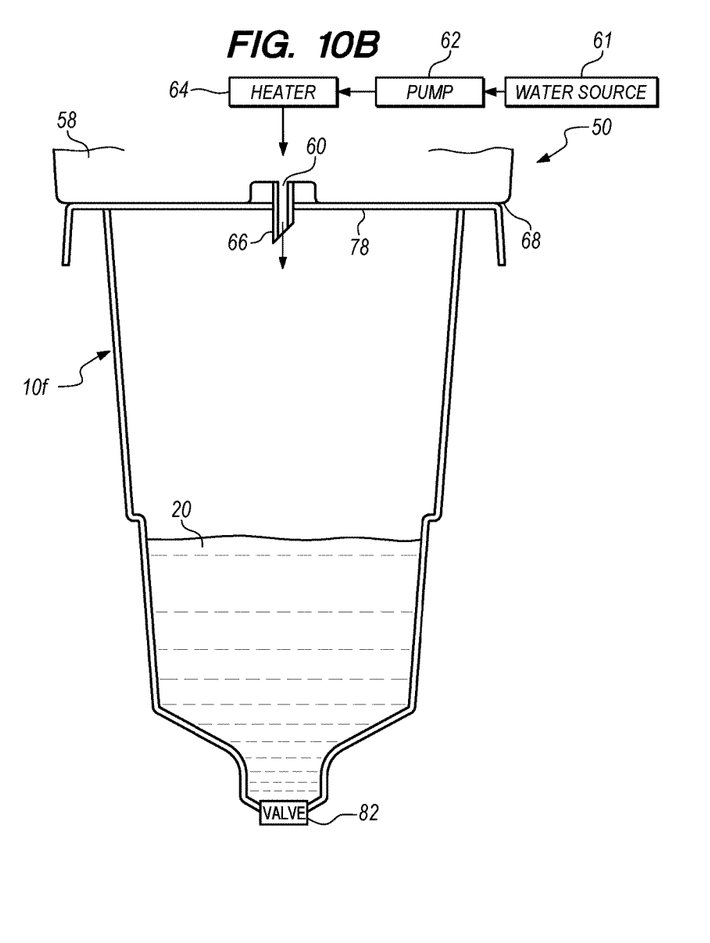

FIGS. 10A and 10B are schematic representations of the coffee maker 50 of FIGS. 4A-7B, 9A, and 9B, including cross-sectional views of another container 10f placed inside the coffee maker 50 without an adapter 30, with FIG. 10A showing the coffee maker 50 in an open position and FIG. 10B showing the coffee maker 50 in a closed position. The container 10f may be the same as the container 10e and may similarly be reusable, except that the container 10f may be shaped and sized similarly to an exit needle part 54 (e.g. a Keurig® portion pack holder) of the recess 52 of the coffee maker 50. Thus, in a case where the coffee maker 50 is a Keurig® coffee maker, an example of the shape and size of the container 10f is the My K-Cup® reusable coffee filter by Keurig®. Like the container 10e, since the container 10f may be reusable and not disposable, there is less concern about trash than in the case of the container 10, 10a, etc. and it is not as important to achieve a small size.

When a person wishes to use the container 10f, he/she may pump (e.g. from a pump bottle) or otherwise dispense liquid coffee concentrate 20 into the container 10f through the top 78 (e.g. via the opening 80). The person may then replace the exit needle part 54 and funnel part 56 of the coffee maker 50 with the container 10f as shown in FIGS. 9A and 9B (e.g. in the case of a Kuerig® coffee maker 50, the Keurig® portion pack holder may be pushed up from below and removed, and the container 10f may be placed in the resulting recess just like a My K-Cup® reusable coffee filter). With the lid 58 of the coffee maker 50 lowered as shown in FIG. 10B, heated water may then flow from the water conduit 60 into the container 10f through the entrance needle 66, and the combined heated water and liquid coffee concentrate 20 may flow out of the container 10f through the valve 82 and down into the person's coffee cup. As in the case of the container 10e, when the coffee making process is completed, it may be unnecessary to clean the container 10f, as the heated water from the coffee maker 50 may sufficiently clean the inside of the container 10f as the water flows through the reusable container 10f.

In the above examples, water and liquid coffee concentrate 20 (and combined water and liquid coffee concentrate 20) are described as flowing through hollow needles 38, 55, 55d, 66. However, it is also contemplated that the needle 38, 55, 55d, 66 may instead only pierce the sealed container 10, 10a, etc. without additionally functioning as a conduit for the water and/or liquid coffee concentrate 20. For example, the needle 38, 55, 55d, 66 may retract subsequent to puncturing the sealed container 10, 10a, etc. or be structured to allow the water and/or liquid coffee concentrate 20 to flow adjacent to or around the outside of the needle 38, 55, 55d, 66.

In the above examples, the top and bottom of the water and/or liquid coffee concentrate 20 enters or exits the sealed container 10, 10a, etc. through the top or bottom of the sealed container 10, 10a, etc. Other points of entry or exit are also contemplated, such as the side.

In the above examples, generally cylindrical shapes are depicted for the sealed container 10, 10a, etc. However, other shapes are contemplated as well, such as balls, boxes, etc., and it is contemplated that adapters 30, 30a, etc. may be designed to accommodate such shapes. It is similarly envisioned that the exterior of the adapter 30, 30a, etc. may be designed to fit inside any single-serve coffee maker, e.g. coffee makers by Keurig®, Nespresso®, Mr. Coffee®, Cuisinart®, Presto® MyJo™, Bunn®, etc., and may be designed to fit universally inside more than one coffee maker.

The detailed description set forth above in connection with the appended drawings is intended as a description of the several presently contemplated embodiments of these systems and methods, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for preparing a single serving of coffee using a liquid coffee concentrate, the system comprising:
    an amount of liquid coffee concentrate for the preparation of the single serving of coffee wherein the amount of liquid coffee concentrate is between 1 ml and 40 ml;
    a sealed container containing the amount of liquid coffee concentrate for the preparation of the single serving of coffee; and
    a coffee maker operable to prepare the single serving of coffee from the liquid coffee concentrate contained in the sealed container, the coffee maker including:
        a coffee maker recess for receiving the sealed container;
        a first coffee maker needle for piercing an entrance hole in an upper portion of the sealed container while the sealed container is in the coffee maker recess;
        a water conduit by which water from a water source flows into the sealed container through the entrance hole;
        a heater for heating the water; and second and third needles offset from each other;
wherein the second needle is operative for piercing an exit hole in a lower portion of the sealed container while the sealed container is in the coffee maker recess.

2. The system of claim 1, wherein the sealed container contains about 5-10 mL of liquid coffee concentrate.

3. The system of claim 1, wherein the sealed container has an exterior volume of less than 25 mL.

4. The system of claim 1, wherein the sealed container comprises a shell made from a durable paper and a coating made from a waterproof wax, plastic, or parchment.

5. The system of claim 1, wherein the sealed container has an exterior volume of less than 25 mL.

6. The system of claim 1, wherein the second needle is disposed within the coffee maker recess.

7. The system of claim 1, wherein the third needle is disposed outside of the coffee maker recess.

8. The system of claim 1, wherein the second and third needles are laterally offset from each other.

9. The system of claim 1, wherein the second and third needles are vertically offset from each other.

* * * * *